US012637852B2

(12) United States Patent
Yang

(10) Patent No.: US 12,637,852 B2
(45) Date of Patent: May 26, 2026

(54) SPRAY PIPE ASSEMBLY, A SPRAY PIPE DEVICE, AND A TOILET

(71) Applicant: Shanghai Kohler Electronics, Ltd., Shanghai (CN)

(72) Inventor: Dong Yang, Shanghai (CN)

(73) Assignee: Shangha KOHLER Electronics, Ltd., Shanghai (CN)

( * ) Notice: Subject to any disclaimer, the term of this patent is extended or adjusted under 35 U.S.C. 154(b) by 266 days.

(21) Appl. No.: 18/236,701

(22) Filed: Aug. 22, 2023

(65) Prior Publication Data

US 2024/0068220 A1 Feb. 29, 2024

(30) Foreign Application Priority Data

Aug. 30, 2022 (CN) ........................ 202211054681.0

(51) Int. Cl.
*E03D 9/08* (2006.01)
*B05B 15/70* (2018.01)

(52) U.S. Cl.
CPC ................ *E03D 9/08* (2013.01); *B05B 15/70* (2018.02)

(58) Field of Classification Search
CPC ........... E03D 9/08; E03D 11/06; E03D 11/13; B05B 15/70; B05B 1/14
See application file for complete search history.

(56) References Cited

U.S. PATENT DOCUMENTS

| | | | | |
|---|---|---|---|---|
| 5,274,856 | A * | 1/1994 | Bernard .................. | E03D 9/085 4/420.4 |
| 9,637,904 | B2 * | 5/2017 | Slothower ............... | E03D 9/085 |
| 2015/0233105 | A1 | 8/2015 | Slothower et al. | |
| 2021/0388593 | A1 * | 12/2021 | Yang ......................... | E03D 9/08 |

FOREIGN PATENT DOCUMENTS

| | | | | |
|---|---|---|---|---|
| CN | 202212281 | U | 5/2012 | |
| CN | 207700308 | U | 8/2018 | |
| CN | 208844687 | U | 5/2019 | |
| CN | 112227482 | A | 1/2021 | |
| CN | 212670751 | U | 3/2021 | |
| JP | 2001090154 | A | 4/2001 | |
| KR | 20110044404 | A * | 4/2011 | ............... A61L 2/18 |

* cited by examiner

*Primary Examiner* — Christine J Skubinna
(74) *Attorney, Agent, or Firm* — Lempia Summerfield Katz LLC

(57) ABSTRACT

A spray pipe assembly includes a pipe body including a mounting channel configured to mount a water pipe. The spray pipe assembly also includes a flushing device, removably mounted at a front end of the pipe body. The flushing device includes a device main body including a mounting cavity. The flushing device also includes a flushing nozzle configured to clean a human body. At least a portion of the flushing nozzle is disposed in the mounting cavity. The flushing nozzle includes at least one spray hole facing upwards. The flushing device also includes a flushing spray head configured to clean a toilet cavity and connected to the device main body. The flushing spray head includes a spray head facing downwards.

14 Claims, 6 Drawing Sheets

SPRAY PIPE ASSEMBLY, A SPRAY PIPE DEVICE, AND A TOILET

CROSS REFERENCE TO RELATED APPLICATION

This application claims the benefit of priority to: Chinese Patent Application No. 202211054681.0 filed in the Chinese Intellectual Property Office on Aug. 30, 2022, which is hereby incorporated by reference in its entirety.

FIELD

The present disclosure relates to the field of sanitary products, and particularly to a spray pipe assembly, a spray pipe device, and a toilet.

BACKGROUND

Smart toilet usually has a flushing function, which can flush or wash the private parts of a human body and flush or wash the ceramic body of the toilet.

It is usually provided a spray pipe in the smart toilet. The spray pipe is configured with a nozzle to flush the private parts of the human body. A spray head is arranged on one side of the spray pipe to flush the ceramic body.

The spray head and the spray pipe are independent of each other and take up a lot of space. The water pipe of the spray head is independently or separately arranged on the outside of the spray pipe, and an additional sealing protection structure is required, resulting in a complex structure and inconvenient installation.

In view of this, it is necessary to provide a new type of spray pipe assembly, spray pipe device and toilet.

SUMMARY

The present disclosure aims to overcome the defects in the prior art and provide a spray pipe assembly, a spray pipe device, and a toilet. The spray pipe assembly, the spray pipe device, and the toilet integrate a flushing nozzle configured to flush or wash a human body and a flushing spray head configured to flush or wash a toilet cavity into a flushing device located at the front end. All the water pipes can be arranged in a pipe body. Thus, the installation space may be saved, the volume may be reduced, the structure may be simplified, and the installation may be facilitated.

According to an embodiment of the present disclosure, a spray pipe assembly comprises a pipe body and a flushing device removably mounted at a front end of the pipe body.

A mounting channel configured to mount a water pipe is disposed in the pipe body.

The flushing device comprises a device main body having a mounting cavity, a flushing nozzle configured to flush a human body and a flushing spray head configured to flush a toilet cavity.

The flushing nozzle is at least partially mounted in the mounting cavity. The flushing nozzle comprises a spray hole facing upwards. The flushing spray head is connected to the device main body and has a spray head facing downwards.

A spray hole water supply channel and a spray head water supply channel that are independent to each other are formed between the flushing nozzle and a wall of the mounting cavity;

An inlet of the spray hole water supply channel and an inlet of the spray head water supply channel are disposed in the mounting channel.

In an embodiment of the present disclosure, the spray hole comprises a front spray hole and a rear spray hole.

The spray hole water supply channel comprises a first water supply channel and a second water supply channel that are independent to each other.

A nozzle water cavity and a nozzle water channel that are independent to each other are provided in the flushing nozzle.

The nozzle water cavity is in fluid communication with the first water supply channel and the front spray hole, and the nozzle water channel is fluid communication with the second water supply channel and the rear spray hole.

In an embodiment of the present disclosure, the second water supply channel is disposed above the first water supply channel, and the spray head water supply channel is disposed between the first water supply channel and the second water supply channel.

In an embodiment of the present disclosure, the spray hole water supply channel and the spray head water supply channel are channel grooves respectively disposed on a circumferential surface of the flushing nozzle.

In an embodiment of the present disclosure, the channel grooves are closed loop recesses or spiral recesses that surround the circumferential surface of the flushing nozzle.

In an embodiment of the present disclosure, the spray hole water supply channel and the spray head water supply channel are provided with seal rings respectively on the upper and lower sides of the spray hole water supply channel and the spray head water supply channel. The seal rings are in sealed contact with the wall of the mounting cavity.

In an embodiment of the present disclosure, a positioning groove is provided at the position on the wall of the mounting cavity at each position corresponding to a position of each seal ring. Each seal ring is at least partially assembled in or engaged with the positioning groove.

In an embodiment of the present disclosure, the inlet of the spray hole water supply channel is connected to a spray hole water supply pipe head, and the inlet of the spray head water supply channel is connected to a spray head water supply pipe head.

The spray hole water supply pipe head and the spray head water supply pipe head are disposed in the mounting channel.

In an embodiment of the present disclosure, a nozzle panel is disposed on a top of the flushing nozzle, and the spray hole is disposed on the nozzle panel.

In an embodiment of the present disclosure, the pipe body is a curved bend pipe, and the spray hole extends forwards and upwards at an angle when the pipe body is in an extension state.

In an embodiment of the present disclosure, a mounting groove is disposed on a front side of the device main body, and the flushing spray head is disposed in the mounting groove.

An end cap is removably connected to a front portion of the mounting groove.

According to an embodiment of the present disclosure, a spray pipe device comprises a mounting bracket, a control water valve, a driving mechanism, and the spray pipe assembly according to any of the embodiments described above.

The pipe body is slidably connected to the mounting bracket.

The control water valve is connected to at least two water supply hoses. The at least two water supply hose pass through the mounting channel and are respectively connected to the inlet of the spray hole water supply channel and the inlet of the spray head water supply channel.

The driving mechanism is connected to the pipe body and configured to drive the pipe body to extend out forwards and retract backwards.

In an embodiment of the present disclosure, a pipe body rack is disposed at a bottom of the pipe body.

The driving mechanism comprises a drive motor, a worm, and a drive gear set.

The worm is connected to an output shaft of the drive motor, an input end gear of the drive gear set is engaged with the worm, and an output end gear of the drive gear set is engaged with the pipe body rack.

According to an embodiment of the present disclosure, a toilet comprises a toilet main body comprising a toilet cavity and the spray pipe device according to any of the embodiments described above.

The mounting bracket is connected to a rear portion of the toilet main body.

When the pipe body is in a retraction state, the pipe body is disposed at a rear portion of the toilet cavity.

When the pipe body is in an extension state, a front end of the pipe body extends into the toilet cavity.

By adopting the technical solutions above, the present disclosure has the following beneficial effects:

The present disclosure provides a spray pipe assembly, a spray pipe device, and a toilet, which integrate a flushing nozzle configured to flush (e.g., wash, clean) a human body and integrate a flushing spray head configured to flush (e.g., wash, clean) a toilet cavity into the flushing device at the front end. The spray hole water supply channel in fluid communication with the spray hole and the spray head water supply channel in fluid communication with the flushing nozzle are formed between the outer circumferential surface of the flushing nozzle and the wall of the mounting cavity. All the water supply hoses are arranged in the pipe body, the water can be supplied to the spray hole through the spray hole water supply channel and then sprayed out from the spray hole to clean the private parts of the human body. The water is also supplied to the spray head through the spray head water supply channel and then sprayed out from the spray head to flush the toilet main body.

The present disclosure provides a spray pipe assembly, a spray pipe device, and a toilet. The flushing device is integrated with a flushing nozzle and a flushing spray head. This allows all the water pipes to be arranged in the pipe body. Thus, the installation space may be saved, the volume may be reduced, the structure may be simplified, and the installation may be facilitated.

BRIEF DESCRIPTION OF THE FIGURES

With reference to the drawings, the contents disclosed by the present disclosure should be more easily understood. It should be understood that these drawings are merely used for illustration and are not intended to limit the protection scope of the present disclosure. In the drawings.

DETAILED DESCRIPTION

Figure 1:
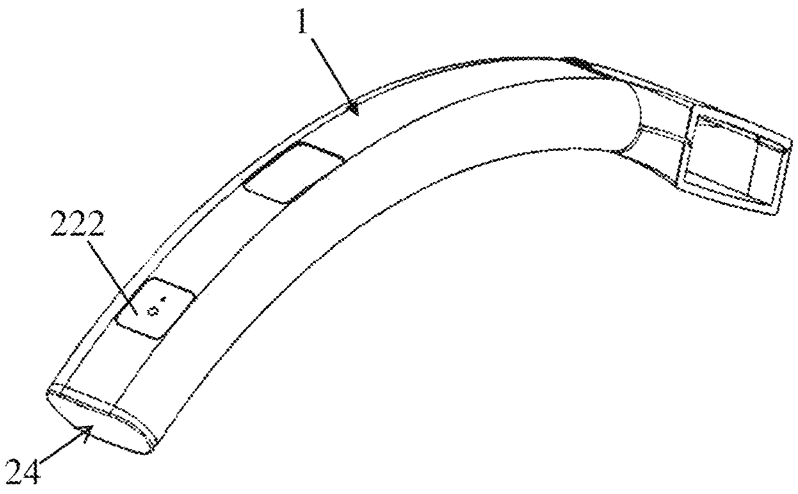
FIG. 1 is a perspective view of a spray pipe assembly according to an example of the present disclosure.

The specific embodiments of the present disclosure are further described with reference to the drawings hereinafter. Same or equivalent parts are denoted by the same reference numerals. It should be noted that the terms "front", "back", "left", "right", "up" and "down" used in the following description refer to the directions in the drawings, and the terms "inner" and "outer" refer to the directions towards or far away from geometric centers of specific parts respectively.

Figure 2:
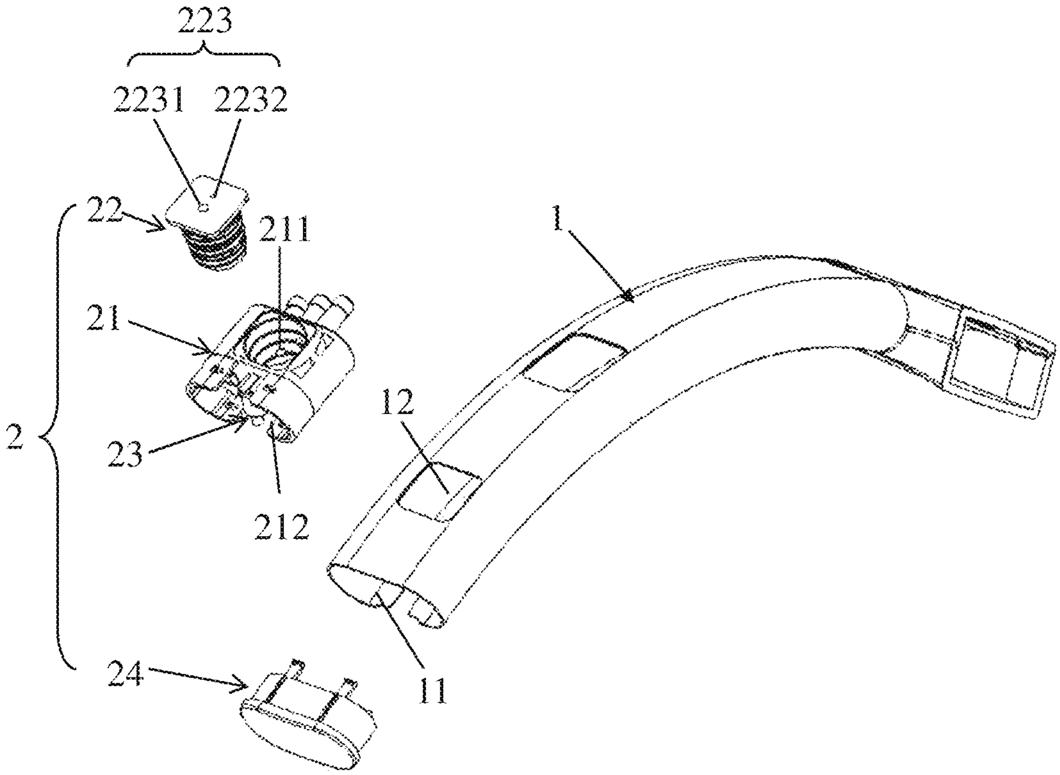
FIG. 2 is an exploded view of the spray pipe assembly according to an example of the present disclosure.
Figure 3:
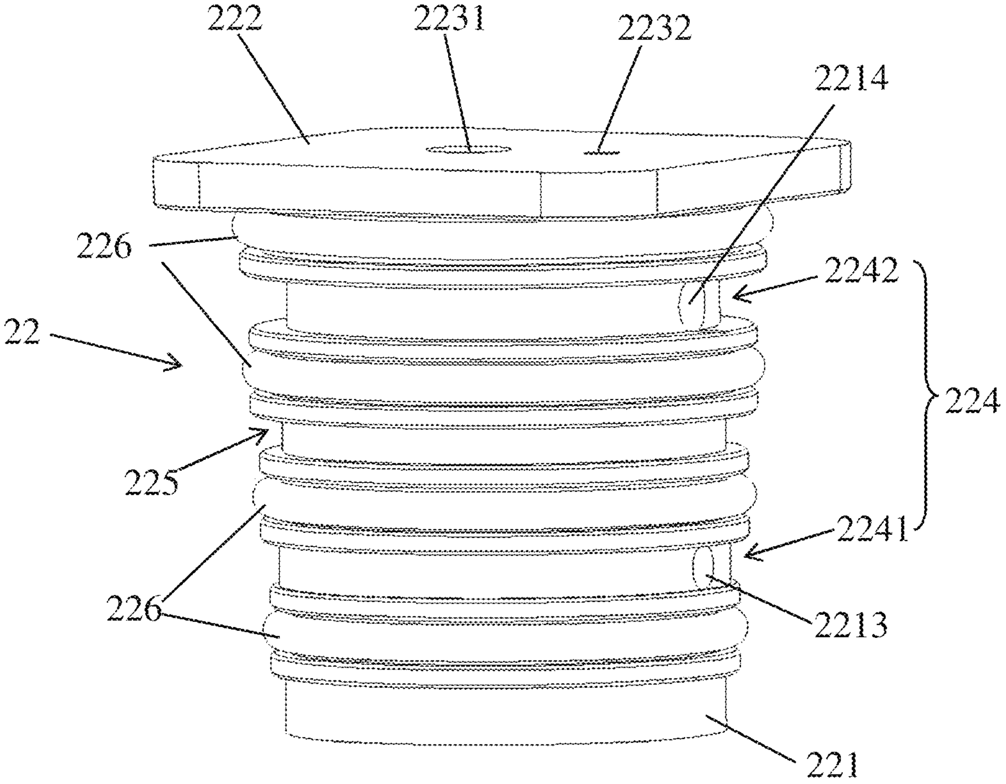
FIG. 3 is a perspective view of a flushing nozzle.
Figure 4:
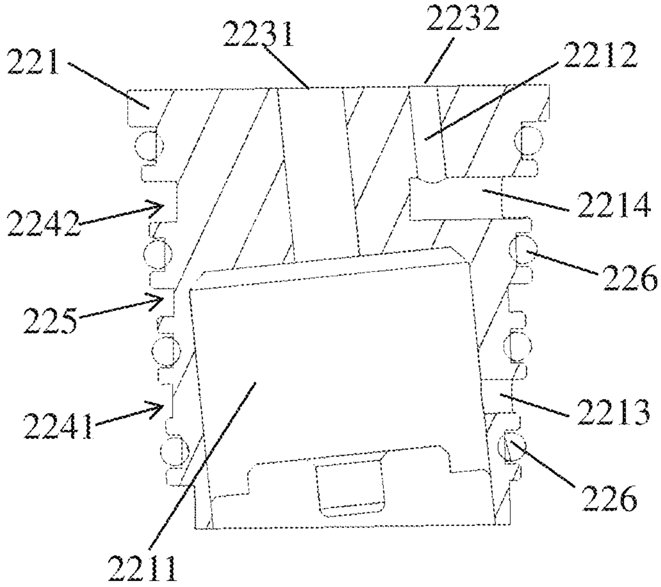
FIG. 4 is a sectional view of the flushing nozzle.
Figure 5:
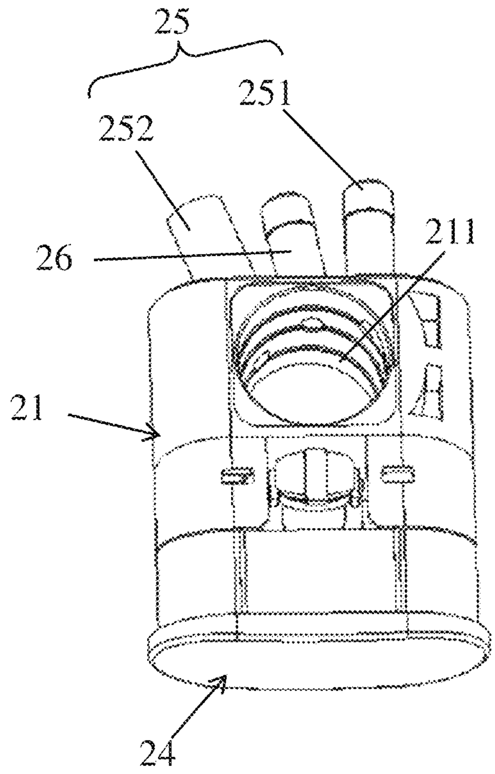
FIG. 5 is a top view of the flushing device with the flushing nozzle removed.
Figure 6:
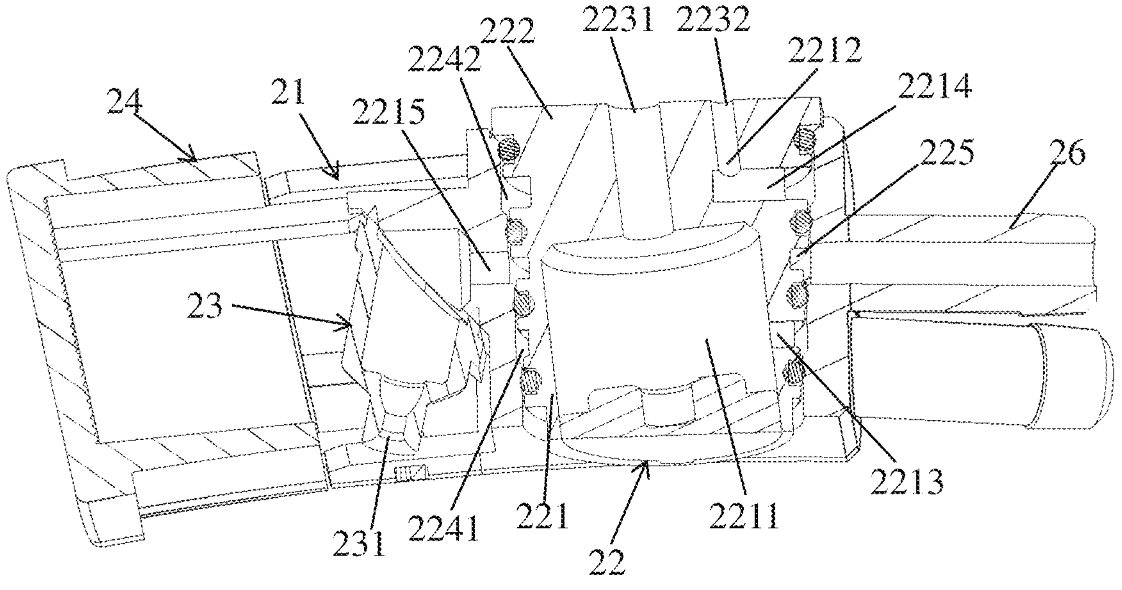
FIG. 6 is a sectional view of the flushing device.
Figure 9:
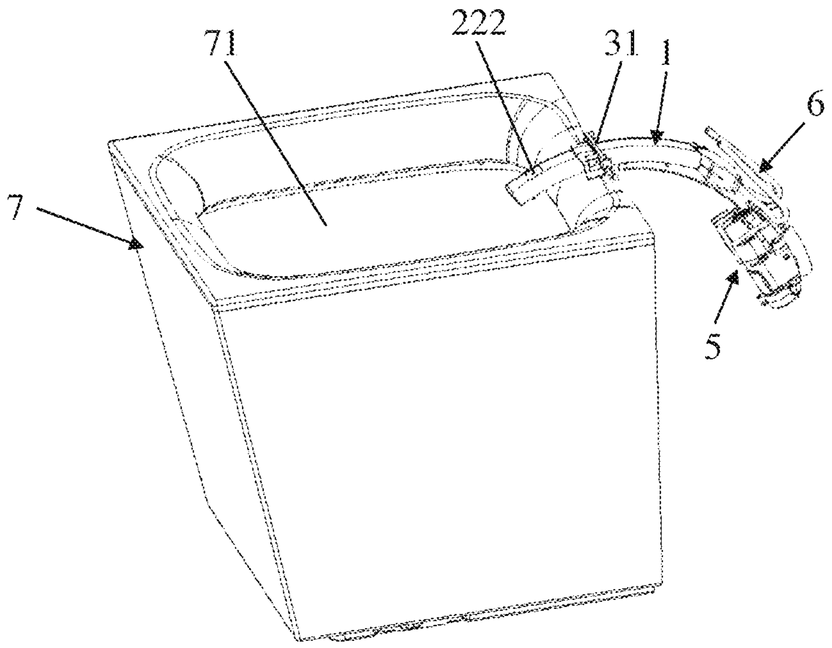
FIG. 9 is a perspective view of a toilet according to an example of the present disclosure.
Figure 10:
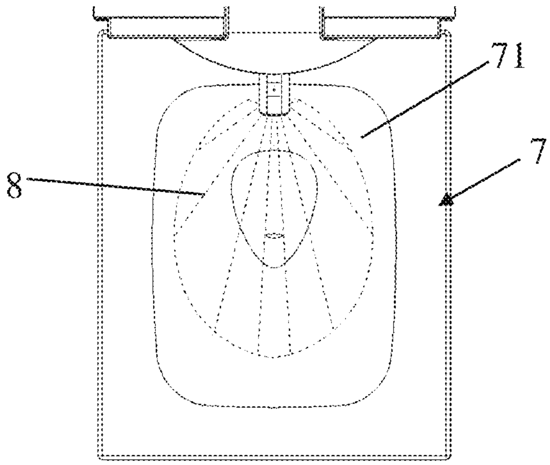
FIG. 10 is a schematic diagram of the flushing nozzle spraying water to flush a toilet cavity of a toilet body.

FIG. 1 is a perspective view of a spray pipe assembly according to an example of the present disclosure. FIG. 2 is an exploded view of the spray pipe assembly according to an example of the present disclosure. FIG. 3 is a perspective view of a flushing nozzle. FIG. 4 is a sectional view of the flushing nozzle. FIG. 5 is a top view of the flushing device with the flushing nozzle removed. FIG. 6 is a sectional view of the flushing device. FIG. 9 is a perspective view of a toilet according to an example of the present disclosure. FIG. 10 is a schematic diagram of the flushing nozzle spraying water to flush a toilet cavity of a toilet body. As shown in FIGS. 1-6, 9, and 10, one embodiment of the present disclosure provides a spray pipe assembly comprising a pipe body 1 and a flushing device 2 removably mounted at a front end of the pipe body 1.

The pipe body 1 comprises a mounting channel 11 configured to mount the water pipe.

The flushing device 2 comprises a device main body 21 having a mounting cavity 211, a flushing nozzle 22 configured to flush (e.g., wash, clean) the human body, and a flushing spray head 23 configured to flush (e.g., wash, clean) a toilet cavity 71 of a toilet main body 7.

The flushing nozzle 22 is at least partially mounted in the mounting cavity 211, and the spray hole 223 of the flushing nozzle 22 faces upwards. The flushing spray head 23 is connected to the device main body 21, and the spray head 231 of the flushing spray head 23 faces downwards.

A spray hole water supply channel 224 and a spray head water supply channel 225 are mutually independent (e.g., separately arranged) and formed between the flushing nozzle 22 and the wall of the mounting cavity 211. An inlet of the spray hole water supply channel 224 and an inlet of the spray head water supply channel 225 are located in the mounting channel 11.

The spray pipe assembly of the present disclosure is mainly used for a toilet. The spray pipe assembly comprises the pipe body 1 and the flushing device 2. The pipe body 1 comprises the mounting channel 11 and comprises a mounting hole 12 on an upper part of the front end.

The flushing device 2 is integrated with or comprises the flushing nozzle 22 and the flushing spray head 23. The flushing nozzle 22 is configured to flush the private parts of the human body, and the flushing spray head 23 is configured to flush the toilet main body 7 (ceramic body).

Specifically, the flushing device 2 comprises the device main body 21, the flushing nozzle 22, and the flushing spray head 23.

The device main body 21 comprises a mounting cavity 211, and a top of the mounting cavity 211 is open. The flushing nozzle 22 is mounted in the mounting cavity 211. The flushing spray head 23 is connected to the device main body 21, and the flushing spray head 23 is disposed on an outside of and in front of the mounting cavity 211. The spray head 231 is arranged below the pipe body 1 and faces downwards. After the pipe body 1 is driven and extended out, the spray head 231 sprays water downwards to flush (e.g., wash, clean) the cavity wall of the toilet cavity 71 of the toilet main body 7. The spray head 231 has a large flushing range.

In an embodiment, in a direction of the width of the toilet main body 7, the spray head 231 is disposed in the middle of the toilet cavity 71.

The spray head 231 may comprise a plurality of spray holes in different directions as needed to spray water around so as to increase the range of flushing and cleaning.

The flushing nozzle 22 comprises a spray hole 223 extending upwards. Specifically, the flushing nozzle 22 comprises a columnar or block-shaped nozzle main body 221, and the spray hole 223 is disposed on the nozzle main body 221. The flushing nozzle 22 or the nozzle main body 221 is removably mounted in the mounting cavity 211 and can be pulled out from the mounting cavity 211 for easy maintenance and replacement. The spray hole 223 is disposed in the mounting hole 12.

The spray hole water supply channel 224 and the spray head water supply channel 225 are formed between an outer circumferential surface of the flushing nozzle 22 or the nozzle main body 221 and a wall of the mounting cavity 211. The spray hole water supply channel 224 and the spray head water supply channel 225 are independent of each other (e.g., separately arranged). The spray hole water supply channel 224 and the spray head water supply channel 225 may be recesses provided on the outer circumferential surface of the flushing nozzle 22 or recesses provided on the wall of the mounting cavity 211.

The spray hole water supply channel 224 is in fluid communication with the spray hole 223, and the inlet of the spray hole water supply channel 224 is directed towards or disposed in the mounting channel 11. The spray hole water supply channel 224 may be connected to a control water valve 4 through a water supply hose 6. The water supply hose 6 may be in communication with the spray hole water supply channel 224 through the mounting channel 11. After the control water valve 4 opens a water path or a valve configured to supply the water to the spray hole 223, the water flows through the water supply hose 6 and the spray hole water supply channel 224 and then flows to the spray hole 223. Eventually, the water is sprayed out through the spray hole 223 to flush the private parts of the human body. The water pressure can be set as needed.

The spray head water supply channel 225 is in fluid communication with the flushing spray head 23 via a channel through hole 2215. The inlet of the spray head water supply channel 225 faces towards or is disposed in the mounting channel 11. The spray head water supply channel 225 may be connected to the control water valve 4 through another water supply hose 6. The water supply hose 6 may be in communication with the spray head water supply channel 225 through the mounting channel 11. After the control water valve 4 opens the water path or the valve configured to supply the water to the flushing spray head 23, the water flows to the flushing spray head 23 through the water supply hose 6, the spray head water supply channel 225, and the channel through hole 2215. The water is finally ejected through the spray head 231 to flush the wall of the toilet cavity 71 of the toilet body 7. The water pressure can be set as needed.

The inlet of the spray hole water supply channel 224 and the inlet of the spray head water supply channel 225 are respectively set on a rear wall of the mounting cavity 211.

It should be noted that: the control water valve 4 comprises a plurality of outlets independent of or separate from each other. Each outlet can be controlled by a separate valve, and the water spray of the spray holes 223 and the spray head 231 are controlled independently of or separately from each other. All of the water supply hoses 6 can be threaded or passed into the mounting channel 11 to connect the corresponding inlets of the spray hole water supply channel 224 and the spray head water supply channel 225.

Thus, for the spray pipe assembly of the present disclosure, the flushing device 2 is integrated with the flushing nozzle 22 and the flushing spray head 23, so that the water pipes can all be arranged in the pipe body 1. Thus, installation space may be saved, the volume may be reduced, the structure may be simplified, and the installation may be facilitated.

In an embodiment, as shown in FIGS. 2-6, the spray holes 223 comprise a front spray hole 2231 and a rear spray hole 2232.

The spray hole water supply channel 224 comprises a first water supply channel 2241 and a second water supply channel 2242 that are independent of or separate from each other.

The flushing nozzle 22 is provided with a nozzle water cavity 2211 and a nozzle water channel 2212 that are mutually independent or separate from each other.

The nozzle water cavity 2211 is in fluid communication with the first water supply channel 2241 and the front spray hole 2231, and the nozzle water channel 2212 is in fluid communication with the second water supply channel 2242 and the rear spray hole 2232. In this embodiment, the spray holes 223 comprise the front spray hole 2231 and the rear spray hole 2232. The front spray hole 2231 is basically provided in a substantially middle area of the nozzle panel 222, and the rear spray hole 2232 is disposed on the rear side of the front spray hole 2231. In use, the front spray hole 2231 is mainly configured to flush the privacy parts on the front side of the human anus, and the rear spray hole 2232 is mainly configured to flush the anus area of the human body. In an embodiment, the aperture diameter of the front spray hole 2231 is larger than the aperture diameter of the rear spray hole 2232.

Accordingly, the spray hole water supply channel 224 comprises a first water supply channel 2241 and a second water supply channel 2242, and the first water supply channel 2241 and the second water supply channel 2242 are independent of or separate from each other. The first water supply channel 2241, the second water supply channel 2242, and the spray head water supply channel 225 are arranged independently of or separately from each other and spaced apart from each other. An inlet of both the first water supply channel 2241 and an inlet of the second water supply channel 2242 face towards or are disposed in the mounting channel 11. The inlet of the first water supply channel 2241 and the inlet of the second water supply channel 2242 can be connected to the control water valve 4 through the water supply hose 6 respectively to achieve independent water supply.

The flushing nozzle 22 is provided with a nozzle water cavity 2211 and a nozzle water channel 2212 in it. Specifically, the nozzle water cavity 2211 and the nozzle water channel 2212 are disposed in the nozzle main body 221. The nozzle water chamber 2211 has a larger volume and is disposed in the middle of the nozzle main body 221. The nozzle water channel 2212 is disposed on one side of the nozzle water cavity 2211, and the nozzle water channel 2212 is relatively narrower (e.g., has a smaller volume) to facilitate the maintenance of water pressure. An upper end of the nozzle water cavity 2211 is in fluid communication with the front spray hole 2231, and an upper end of the nozzle water channel 2212 is in fluid communication with the rear spray hole 2232.

The nozzle main body 221 is provided with a water cavity communication hole 2213 and a water channel communication hole 2214. The first water supply channel 2241 is in fluid communication with the nozzle water cavity 2211 through the water cavity communication hole 2213. The second water supply channel 2242 is in fluid communication with the nozzle water channel 2212 through the water channel communication hole 2214.

When it is needed to use the front spray hole 2231 to spray water for flushing, the control water valve 4 opens the corresponding water path or the valve, and the water enters in turn the water supply hose 6, the first water supply channel 2241, the water cavity communication hole 2213, and the nozzle water cavity 2211. Then, the water is sprayed out of the front spray hole 2231.

When it is needed to use the rear spray hole 2232 to spray water for flushing, the control water valve 4 opens the corresponding water path or the valve, and the water enters in turn the water supply hose 6, the second water supply channel 2242, the water channel communication hole 2214, and the nozzle water channel 2212. Then, the water is sprayed out of the rear spray hole 2232.

In this embodiment, the water path of the front spray holes 2231 and the rear spray holes 2232 can be controlled independently of or separately from each other.

In an embodiment, as shown in FIGS. 3, 4, and 6, the second water supply channel 2242 is disposed above the first water supply channel 2241, and the spray head water supply channel 225 is disposed between the first water supply channel 2241 and the second water supply channel 2242.

In this embodiment, the first water supply channel 2241 is disposed in a lower position, the height of the nozzle water cavity 2211 can be properly increased, and the volume of the nozzle water cavity 2211 can be increased, so that the water, after entering the nozzle water cavity 2211, may have a buffering and pressure reducing effect. Thus, the high-pressure water may be prevented from being directly sprayed out of the front spray hole 2231. By contrast, the rear spray hole 2232 needs a slightly higher water pressure, so the second water supply channel 2242 can be arranged in a higher position. This can shorten the length of the nozzle water channel 2212 and is beneficial for the water to quickly spray out from the rear spray hole 2232.

In an embodiment, as shown in FIGS. 3, 4, and 6, the spray hole water supply channel 224 and the spray head water supply channel 225 are respectively channel grooves disposed on the circumferential surface of the flushing nozzle 22.

In this embodiment, independent channel grooves are pre-set on the circumferential surface of the flushing nozzle 22, and the channel grooves are recesses. Specifically, the channel groove is disposed on the circumferential surface of the nozzle main body 221.

As needed, the recesses can be formed on the circumferential surface of the flushing nozzle 22 or the nozzle main body 221 to form the channel grooves. Also, according to the need, convex ribs can be arranged at intervals (e.g., spaced apart from each other) on the circumferential surface of the flushing nozzle 22 or the nozzle main body 221, and thus a channel groove can be formed between two convex ribs adjacent from top to bottom.

After the flushing nozzle 22 is mounted in the mounting cavity 211, a contact seal is formed between the wall of the channel grooves and the wall of the mounting cavity 211, thus the corresponding spray hole water supply channel 224 and the corresponding spray head water supply channel 225 may be formed.

The spray hole water supply channel 224 and the spray head water supply channel 225 are two separate channel grooves, and the first water supply channel 2241 and the second water supply channel 2242 of the spray hole water supply channel 224 are also two separate channel grooves.

In an embodiment, the channel grooves are closed loop recesses or spiral recesses that surround the circumferential surface of the flushing nozzle 22.

In this embodiment, each channel groove may be a circular recess, which has a closed-loop structure surrounding the circumferential surface of the flushing nozzle 22.

Each channel groove may also be a spiral recess, which surrounds the circumferential surface of the flushing nozzle 22 and extends spirally in the up and down direction (e.g., of the flushing nozzle 22).

The arrangement of closed-loop recesses or spiral recesses allows for different arrangements.

As needed, the spray head water supply channel 225 can be provided as a closed-loop recess to direct the water from the inlet disposed at the rear side of the mounting cavity 211 to the channel through hole 2215 disposed at the front side of the mounting cavity 211. Then, the water is introduced into the flushing spray head 23. The excess water is circulated through the closed-loop recess.

As needed, the spray hole water supply channels 224 (the first water supply channel 2241 and the second water supply channel 2242) can be provided as spiral recesses to direct the water upwards to the top spray holes 223.

In an embodiment, as shown in FIGS. 3, 4, and 6, the spray hole water supply channel 224 and the spray head water supply channel 225 are provided with seal rings 226 on the upper and lower sides of the spray hole water supply channel 224 and the spray head water supply channel 225, respectively. The seal rings 226 are in sealed contact with the wall of the mounting cavity 211.

In this embodiment, the seal rings 226 are provided on the upper and lower sides of the spray hole water supply channel 224 and the spray head water supply channel 225, respectively, to seal the water in each channel to avoid mixing or leakage of the water.

Specifically, a seal ring 226 is provided on each of the upper and lower sides of the first water supply channel 2241, the second water supply channel 2242, and the spray head water supply channel 225.

Each seal ring 226 projects out of the circumferential surface of the flushing nozzle 22 or the nozzle main body 221. The seal ring 226 is used as a wall of each channel groove, without the need to specifically set a groove or arrange a convex rib on the circumferential surface of the flushing nozzle 22 or nozzle main body 221. A channel groove is formed between the two seal rings 226 adjacent from top to bottom. Thus, the sealing effect may be improved, and the formation of the first water supply channel 2241, the second water supply channel 2242 and the spray head water supply channel 225 may be facilitated.

In an embodiment, the wall of the mounting cavity 211 is provided with a positioning groove corresponding to a position of each seal ring 226, and each seal ring 226 is at least partially assembled in or engaged with the positioning grooves.

In this embodiment, six positioning grooves are correspondingly configured on the wall of the mounting cavity 211 to limit the position of the six seal rings 226. The edge of each seal ring 226 is disposed in a positioning groove to achieve a sealed connection and improve the installation stability of the seal ring 226.

In an embodiment, as shown in FIGS. 2 and 5, the inlet of the spray hole water supply channel 224 is connected to a spray hole water supply pipe head 25 and the inlet of the spray head water supply channel 225 is connected to a spray head water supply pipe head 26. The spray hole water supply pipe head 25 and the spray head water supply pipe head 26 are both disposed in the mounting channel 11.

The spray hole water supply pipe head 25 is connected to the inlet of the spray hole water supply channel 224, which is disposed in the mounting channel 11, to facilitate connection to the control water valve 4 through the water supply hose.

As noted above, the spray hole water supply channel 224 comprises the first water supply channel 2241 and the second water supply channel 2242. Correspondingly, the spray hole water supply pipe head 25 comprises a first water supply pipe head 251 and a second water supply pipe head 252. The first water supply pipe head 251 is connected to the inlet of the first water supply channel 2241, and the second water supply pipe head 252 is connected to the inlet of the second water supply channel 2242. The first water supply pipe head 251 and the second water supply pipe head 252 are both disposed in the mounting channel 11 for easy connection to the control water valve 4 via the water supply hose.

The spray head water supply pipe head 26 is connected to the inlet of the spray head water supply channel 225, which is disposed in the mounting channel 11 for easy connection to the control water valve 4 via the water supply hose.

In an embodiment, as shown in FIGS. 3 and 4, the flushing nozzle 22 comprises a nozzle panel 222 disposed on a top of the flushing nozzle 22, and a spray hole 223 is disposed on the nozzle panel 222.

In this embodiment, the nozzle panel 222 is disposed at the top of the flushing nozzle 22. The spray holes 223 are disposed on the nozzle panel 222.

Specifically, the nozzle panel 222 is connected to a top end of the nozzle main body 221. After the nozzle panel 222 is assembled, the nozzle panel 222 is disposed in the mounting hole 12 at the front of the pipe body 1. The top surface of the nozzle panel 222 has a smooth transition with the top surface of the pipe body 1 to avoid abrupt connection. In an embodiment, as shown in FIGS. 1 and 2, the pipe body 1 is a curved bend pipe, when the pipe body 1 is in an extended state, the spray hole 223 extends forwards and upwards at an angle.

When the pipe body 1 is driven forwards and extended, the front end of the curved bend pipe enters the toilet cavity 71 forwards and downwards. Thus, the spray hole 223 tilts forwards and upwards to facilitate the cleaning of the user's private parts. Meanwhile, the spray head 231 of the flushing spray head 23 faces slightly backwards to help flush out dirt adhering to the rear of the toilet cavity 71.

In an embodiment, as shown in FIGS. 1 and 2, the front side of the device main body 21 comprises a mounting groove 212 in which the flushing spray head 23 is mounted. An end cap 24 is removably connected to a front portion of the mounting groove 212.

In this embodiment, the flushing spray head 23 is mounted in the mounting groove 212 on the front side of the device main body 21, and then the front side groove of the mounting groove 212 is covered by the end cap 24 to facilitate the installation of the flushing spray head 23 and also to prevent the user from seeing the flushing spray head 23.

Figure 7:
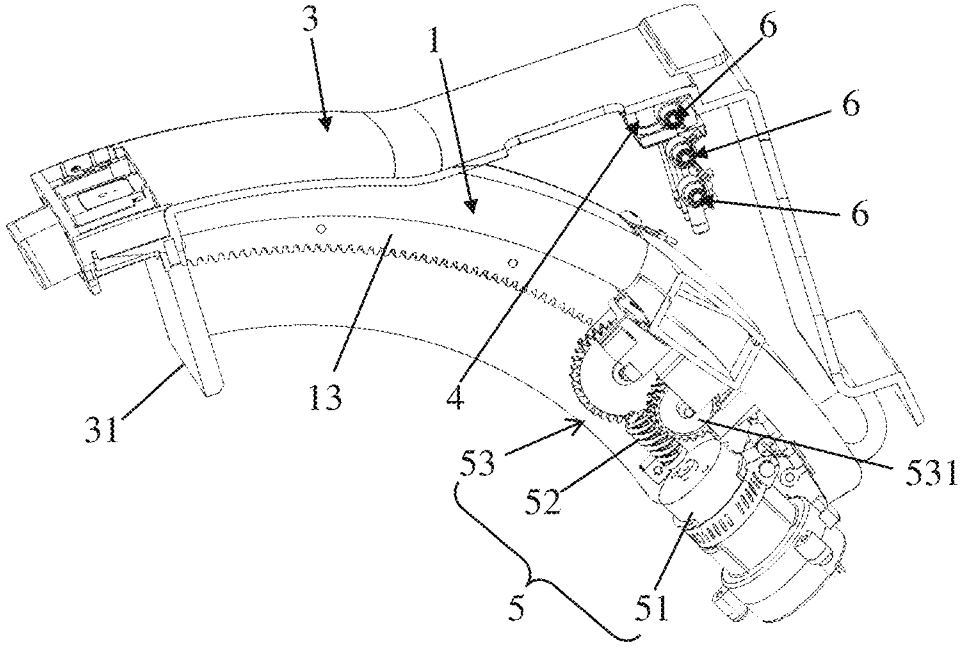
FIG. 7 is a structure schematic diagram of a spray pipe device according to an example of the present disclosure.
Figure 8:
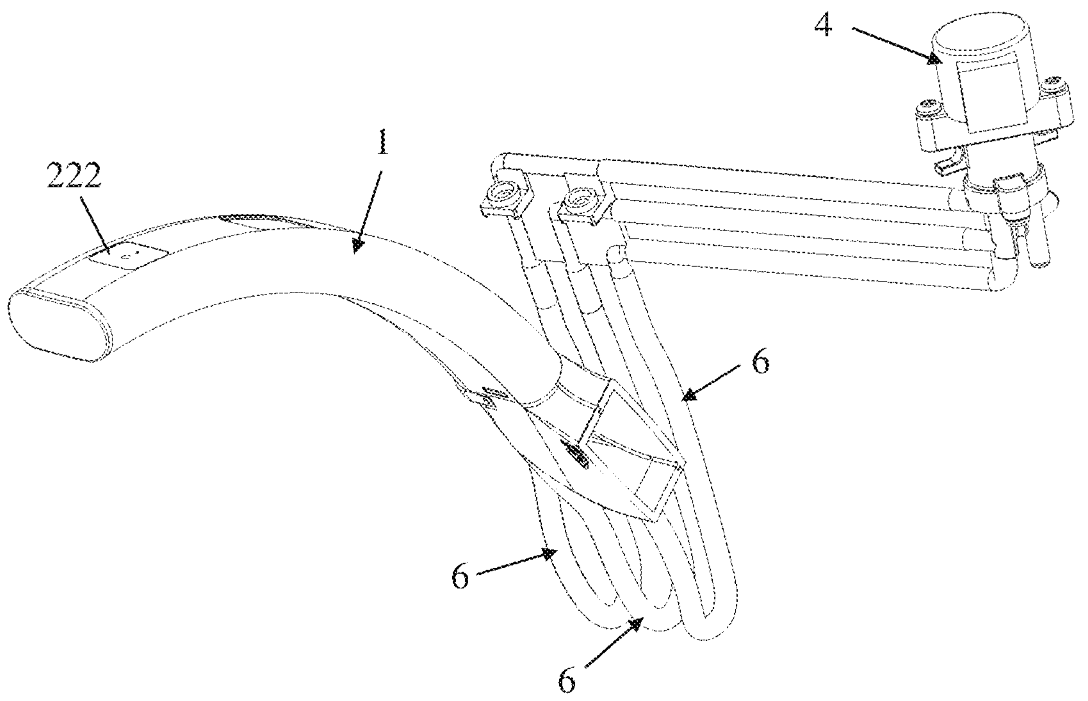
FIG. 8 is a schematic diagram of a control water valve connected to the spray pipe assembly through a water supply hose.

FIG. 7 is a structure schematic diagram of a spray pipe device according to an example of the present disclosure. FIG. 8 is a schematic diagram of a control water valve connected to the spray pipe assembly through a water supply hose. As shown in FIGS. 7 and 8, an embodiment of the present disclosure further provides a spray pipe device, and the spray pipe device comprises a mounting bracket 3, a control water valve 4, a driving mechanism 5, and a spray pipe assembly according to any of the embodiments described above.

The pipe body 1 is slidingly connected to the mounting bracket 3.

The control water valve 4 is connected to at least two water supply hoses 6. The water supply hose 6 passes through the mounting channel 11 and are respectively connected to the inlet of the spray hole water supply channel 224 and the inlet of the spray head water supply channel 225.

The driving mechanism 5 is connected to the pipe body 1 and configured to drive the pipe body 1 to extend out forwards and retract backwards.

The spray pipe device according to the present disclosure is used to be mounted in the rear tank of the toilet main body.

The spray pipe device comprises a mounting bracket 3, a control water valve 4, a driving mechanism 5, and the spray pipe assembly described above.

For the structure, the construction and the working principle of the spray pipe assembly are described in the previous embodiments of the spray pipe assembly and thus are not repeated herein.

A front end of the mounting bracket 3 comprises a mounting plate 31 configured to connect the toilet main body 7. A main portion of the mounting bracket 3 can be configured to assemble the control water valve 4, the driving mechanism 5, and the spray pipe assembly. The structure of the mounting bracket 3 can be designed as needed and is not limited to the specific structure shown in FIG. 7.

The pipe body 1 and the mounting bracket 3 are slidably connected, and a guide rail or a sliding rail can be arranged between them.

The control water valve 4 may be connected to the mounting bracket 3. The control water valve 4 comprises a plurality of outlets, and each of the outlets is connected to a water supply hose 6. All of the water supply hoses 6 pass through the mounting channel 11, the inlets of the spray hole water supply channel 224 and the inlets of the spray head water supply channel 225 are respectively connected to the corresponding water supply hoses 6. Specifically, the water supply hose 6 can be connected to the spray head water supply pipe head 26 and the spray hole water supply pipe head 25 correspondingly.

The driving mechanism 5 may be a motor screw driving mechanism, a piston driving mechanism, or other mechanism configured to drive the pipe body 1 to extend out forwards and retract backwards. The output end of the driving mechanism 5 is connected to the pipe body 1 to drive the pipe body 1 to slide backwards and forwards relative to the mounting bracket 3 to extend out forwards and retracting backwards.

In an initial state, the pipe body 1 is in a state of retracting backwards, and the front end of the pipe body 1 is disposed at the rear of the toilet cavity 71 and is basically received in the rear tank of the toilet main body 7.

When the user needs to spray the water, the user can operate a button of the driving mechanism 5. Then, the driving mechanism 5 drives the pipe body 1 to extend out forwards, and the front end of the pipe body 1 extends into the toilet cavity 71. In that case, the front end of the pipe body 1 is disposed in a position relatively close to the top of the toilet cavity 71. The user may operate the button of the control water valve 4 to spray the water from the spray hole 223 or the spray head 231.

After the user has finished using the toilet, the user can operate the button of the control water valve 4 again to close the corresponding water path. Then, the user can operate the button of the driving mechanism 5 again, and the driving mechanism 5 drives the pipe body 1 to be retracted to the initial position.

In an embodiment, as shown in FIG. 7, the bottom of the pipe body 1 comprises a pipe body rack 13.

The driving mechanism 5 comprises a drive motor 51, a worm 52, and a drive gear set 53.

The worm 52 is connected to an output shaft of the drive motor 51, an input end gear 531 of the drive gear set 53 is engaged with the worm 52, and an output end gear of the drive gear set 53 is engaged with the pipe body rack 13.

In this embodiment, the driving mechanism 5 can be a motor driving mechanism, which comprises the drive motor 51, the worm 52, and the drive gear set 53. The motor driving mechanism has a stable transmission. Correspondingly, the bottom of the pipe body 1 has the pipe body rack 13. The driving mechanism 5 is disposed below the pipe body rack 13.

The drive motor 51 can be selectively mounted on the mounting bracket 3, the worm 52 is connected to the output shaft of the drive motor 51, and the worm 52 extends forwards. The shaft of each gear of the drive gear set 53 is selectively mounted on the mounting bracket 3. The drive gear set 53 comprises an input end gear 531 and an output end gear, and the input end gear 531 and the output end gear may be directly engaged for transmission or engaged through one or more transmission gears for transmission. A radius of the input end gear 531 is smaller than a radius of the output end gear, which acts as a speed reducer.

The input end gear 531 is engaged with the worm 52, and the output end gear is engaged with the pipe body rack 13.

The drive motor 51 may drive the worm 52 to rotate, the rotation of the worm 52 may drive the input end gear 531 to rotate, the rotation of the input end gear 531 drives the output end gear to rotate, and the rotation of the output end gear drives the pipe body 1 to move back and forth through the pipe body rack 13. Thus, the extension and the retraction may be achieved.

As shown in FIGS. 9 and 10, an embodiment of the present disclosure provides a toilet comprising a toilet main body 7 having a toilet cavity 71 and comprising a spray pipe device according to any of the embodiments described above.

The mounting bracket 3 is connected to a rear portion of the toilet main body 7.

When the pipe body 1 is in a retraction state, the pipe body 1 is at a rear portion of the toilet cavity 71.

When the pipe body 1 is in an extension state, a front end of the pipe body 1 extends into the toilet cavity 71.

The toilet provided by the present disclosure comprises a toilet main body 7 (ceramic body) and the spray pipe device described above.

For the structure, the construction and the working principle of the spray pipe device are described in the previous embodiments of the spray pipe device and are not repeated herein.

Generally, the rear portion of the toilet main body 7 comprises a rear tank, and the spray pipe device is mounted in the rear tank through the mounting bracket 3. The mounting bracket 3 can be directly connected to the rear of the toilet main body 7 or connected to the rear tank, and the installation method can be selected according to actual needs.

In the initial state, the pipe body 1 is in a state of retracting backwards, and the front end of the pipe body 1 is located at the rear of the toilet cavity 71 and is basically received in the rear tank of the toilet main body 7.

When the user needs to spray the water, the user can operate the button of the driving mechanism 5. Then, the driving mechanism 5 drives the pipe body 1 to extend out forwards, and the front end of the pipe body 1 extends into the toilet cavity 71. The front end of the pipe body 1 is disposed relatively close to the top in the toilet cavity 71. The user may operate the button of the control water valve 4 to spray the water from the spray hole 223 or the spray head 231.

After the user has finished using the toilet, the user can operate the button of the control water valve 4 again to close the corresponding water path. Then, the user may operate the button of the driving mechanism 5 again, and the driving mechanism 5 drives the pipe body 1 to be retracted to the initial position.

In an embodiment, the toilet includes a base (e.g., a pedestal, bowl, etc.) and a tank. The base is configured to be attached to another object such as a drainpipe, floor, or another suitable object. The base includes a bowl, a sump (e.g., a receptacle) disposed below the bowl, and a trapway fluidly connecting the bowl to a drainpipe or sewage line. The tank may be supported by the base, such as an upper surface of a rim. The tank may be integrally formed with the base as a single unitary body. In other embodiments, the tank may be formed separately from the base and coupled (e.g., attached, secured, fastened, connected, etc.) to the base. The toilet may further include a tank lid covering an opening and inner cavity in the tank. The toilet may include a seat assembly including a seat and a seat cover rotatably coupled to the base. The toilet may further include a hinge assembly.

In another embodiment, the toilet may be a tankless toilet. The toilet includes a base and a seat assembly coupled to the base. The base includes a bowl, a sump disposed below the bowl, and a trapway fluidly connecting the bowl to a drainpipe or sewage line. The toilet includes a waterline that supplies the toilet with water. The toilet may further include a seat assembly including a seat and a seat cover rotatably coupled to the base. The toilets described above are provided herein as non-limiting examples of toilets that may be configured to utilize aspects of the present disclosure.

In some examples, a bidet may be included in a seat or pedestal of a toilet. In other examples, the bidet may be manufactured separately from and attached or coupled to a seat or pedestal of a toilet. The bidet includes a housing. The housing is configured to receive a flow of water through a housing inlet and dispense the flow of water from a housing outlet. The housing inlet and housing outlet may be located on opposite ends of the housing from one another, such that water may flow through the housing from the housing inlet to the housing outlet. In some examples, the housing further includes a chamber. As the housing receives the flow of water, the chamber may fill with water and provide a flow of water between the housing inlet and the housing outlet. The chamber may be configured to contain the flow of water and direct the flow of water from the housing inlet to the housing outlet. After the chamber has filled with water, the flow of water may travel along a substantially linear path between the housing inlet and the housing outlet. In some examples, one or more walls within the housing may be included to help direct a flow of water between the housing inlet and the housing outlet. The bidet may further include a housing inlet conduit configured to direct a flow of water to the housing inlet. The housing inlet conduit may be coupled to a water supply such as tank or waterline. The housing may further include a gear assembly or a portion of the gear assembly.

Figure 11:
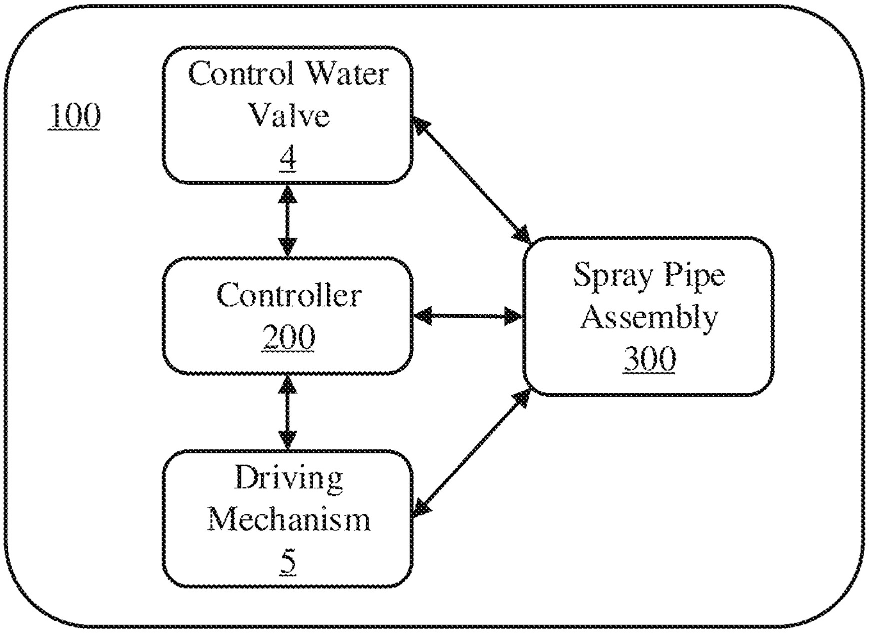
FIG. 11 is a block diagram of a system comprising the spray pipe device.

FIG. 11 is a block diagram of a system comprising the spray pipe device. The spray pipe device used in the system may be the spray pipe device according to any of the foregoing examples and may be configured to perform an operation, function, or the like as described in the present disclosure.

In an embodiment, a system 100 comprises a controller 200, a spray pipe assembly 300 communicably connected to the controller 200, the control water valve 4 communicably connected to the controller 200, and the driving mechanism 5 communicably connected to the controller 200.

The controller 200 in the present disclosure can be implemented by any appliances or by any software or applications run by the appliances. The controller 200 may be connected to a workstation or another external device (e.g., control panel, remote) and/or a database for receiving user inputs, system characteristics, and any of the values described herein. The controller 200 may include a processor. Optionally, the controller 200 may include an input device and/or a sensing circuit in communication with any of the sensors. The sensing circuit receives sensor measurements from as described above. Optionally, the controller 200 may include a drive unit for receiving and reading non-transitory computer media having instructions. Additional, different, or fewer components may be included. The processor is configured to perform instructions stored in memory for executing the algorithms described herein.

The processor may be a general purpose or specific purpose processor, an application specific integrated circuit (ASIC), one or more programmable logic controllers (PLCs), one or more field programmable gate arrays (FPGAs), a group of processing components, or other suitable processing components. Processor is configured to execute computer code or instructions stored in memory or received from other computer readable media (e.g., embedded flash memory, local hard disk storage, local ROM, network storage, a remote server, etc.). The processor may be a single device or combinations of devices, such as associated with a network, distributed processing, or cloud computing.

The spray pipe assembly 300, the control water valve 4, and the driving mechanism 5 may be the spray pipe assembly, the control water valve, and the driving mechanism according to any of the foregoing examples and may be configured to perform an operation, function, or the like as described in the present disclosure.

Figure 12:
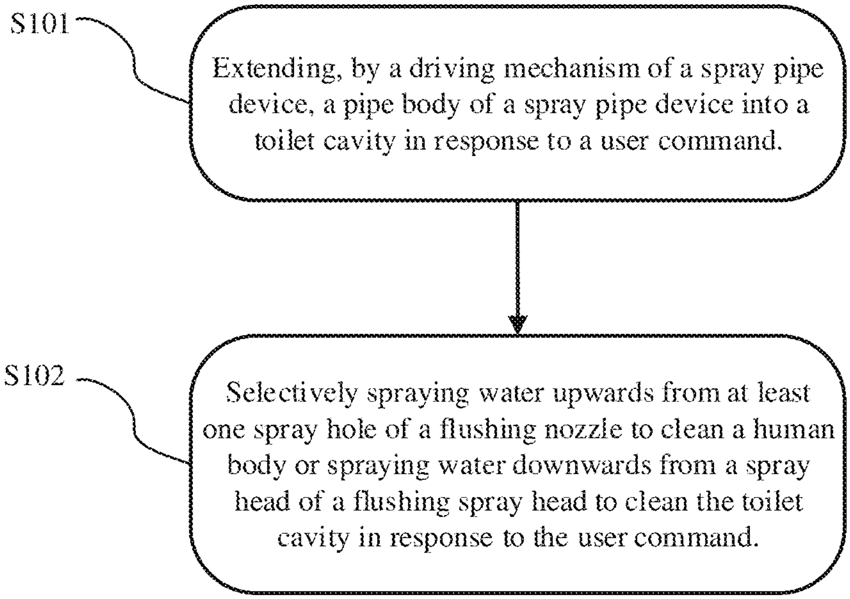
FIG. 12 is a flow chart of a method for cleaning a human body and a toilet cavity by using the spray pipe device according to an example of the present disclosure.

FIG. 12 is a flow chart of a method for cleaning a human body and a toilet cavity by using the spray pipe device according to an example of the present disclosure. The spray pipe device used in the method may be the spray pipe device according to any of the foregoing examples and may be configured to perform an operation, function, or the like as described in the present disclosure.

At act S101, the driving mechanism 5 of the spray pipe device may extend the pipe body 1 of the spray pipe device into the toilet cavity 71 in response to a user command.

As noted above, in the initial state, the pipe body 1 is in the state of retracting backwards, and the front end of the pipe body 1 is disposed at the rear of the toilet cavity 71 and is basically received in the rear tank of the toilet main body 7. When the user needs to spray the water, the user can operate the button of the driving mechanism 5. Then, the driving mechanism 5 drives the pipe body 1 to extend out forwards, and the front end of the pipe body 1 extends into the toilet cavity 71. In that case, the front end of the pipe body 1 is disposed in a position relatively close to the top of the toilet cavity 71.

At act S102, in response to the user command, a controller of the spray pipe device may selectively spray the water upwards from the at least one spray hole 223 of the flushing nozzle 22 to clean the human body or spray the water downwards from the spray head 231 of the flushing spray head 23 to clean the toilet cavity 71.

As noted above, the user may operate the button of the control water valve 4 to spray the water from the spray hole 223 or the spray head 231. Specifically, the control water valve 4 may open the first water supply channel 2241 of the spray hole water supply channel 224 to supply the water to the front spray hole 2231 of the at least one spray hole 223. The water from the first water supply channel 2241 is supplied to the front spray hole 2231 through the water cavity communication hole 2213 and the nozzle water cavity 2211.

The control water valve 4 may open the second water supply channel 2242 of the spray hole water supply channel 224 to supply the water to the rear spray hole 2232 of the at least one spray hole 223. The water from the second water supply channel 2242 is supplied to the rear spray hole 2232 through the water channel communication hole 2214 and the nozzle water channel 2212.

The control water valve 4 may open the spray head water supply channel 225 to supply the water to the spray head 231. As noted above, the spray head water supply channel 225 is in fluid communication with the flushing spray head 23 via the channel through hole 2215. The inlet of the spray head water supply channel 225 faces towards or is disposed in the mounting channel 11. The spray head water supply channel 225 may be connected to the control water valve 4 through another water supply hose 6. The water supply hose 6 may be in communication with the spray head water supply channel 225 through the mounting channel 11. After the control water valve 4 opens the water path or the valve configured to supply the water to the flushing spray head 23, the water flows to the flushing spray head 23 through the water supply hose 6, the spray head water supply channel 225, and the channel through hole 2215. The water is finally ejected through the spray head 231 to flush the wall of the toilet cavity 71 of the toilet body 7. The water pressure can be set as needed.

The above embodiments may be combined as required to achieve the best technical effect.

The above are merely the principle and the embodiments of the present disclosure. It should be pointed out that, for those of ordinary skill in the art, other modifications may be made on the basis of the principle of the present disclosure, which should also be regarded as falling in the protection scope of the present disclosure.

I claim:

1. A spray pipe assembly, comprising:

a pipe body comprising:

a mounting channel configured to mount a water pipe; and a flushing device, removably mounted at a front end of the pipe body, the flushing device comprising:

a device main body comprising a mounting cavity;

a flushing nozzle configured to clean a human body, wherein at least a portion of the flushing nozzle is disposed in the mounting cavity, and the flushing nozzle comprises at least one spray hole facing upwards; and a flushing spray head configured to clean a toilet cavity and connected to the device main body, wherein the flushing spray head comprises a spray head facing downwards;

a spray hole water supply channel formed between the flushing nozzle and a wall of the mounting cavity and in fluid communication with the at least one spray hole; and a spray head water supply channel formed between the flushing nozzle and the wall of the mounting cavity and in fluid communication with the spray head, wherein the spray hole water supply channel and the spray head water supply channel are separately arranged, and wherein an inlet of the spray hole water supply channel and an inlet of the spray head water supply channel are disposed in the mounting channel wherein the at least one spray hole comprises a front spray hole and a rear spray hole, wherein the spray hole water supply channel comprises a first water supply channel and a second water supply channel, and wherein the flushing nozzle comprises a nozzle water cavity in communication with the first water supply channel and the front spray hole and comprises a nozzle water channel in communication with the second water supply channel and the rear spray hole, wherein the second water supply channel is disposed above the first water supply channel, and wherein the spray head water supply channel is disposed between the first water supply channel and the second water supply channel.

2. The spray pipe assembly according to claim 1, wherein the spray hole water supply channel and the spray head water supply channel are respectively channel grooves disposed on a circumferential surface of the flushing nozzle.

3. The spray pipe assembly according to claim 2, wherein the channel grooves are closed loop recesses or spiral recesses that surround the circumferential surface of the flushing nozzle.

4. The spray pipe assembly according to claim 2, further comprising seal rings disposed on upper and lower sides of the spray hole water supply channel and disposed on upper and lower sides of the spray head water supply channel, wherein the seal rings are in sealed contact with the wall of the mounting cavity.

5. The spray pipe assembly according to claim 4, further comprising a positioning groove disposed on the wall of the mounting cavity at each position corresponding to a position of each seal ring, wherein at least of a portion of each seal ring is engaged with the positioning groove.

6. The spray pipe assembly according to claim 1, wherein the inlet of the spray hole water supply channel is connected to a spray hole water supply pipe head, wherein the inlet of the spray head water supply channel is connected to a spray head water supply pipe head, and wherein the spray hole water supply pipe head and the spray head water supply pipe head are disposed in the mounting channel.

7. The spray pipe assembly according to claim 6, wherein the flushing nozzle comprises a nozzle main body, wherein the nozzle main body comprises a water cavity communication hole and a water channel communication hole, wherein the first water supply channel is in fluid communication with the nozzle water cavity through the water cavity communication hole, and wherein the second water supply channel is in fluid communication with the nozzle water channel through the water channel communication hole.

8. The spray pipe assembly according to claim 7, wherein the spray hole water supply pipe head comprises a first water supply pipe head connected to an inlet of the first water supply channel and comprises a second water supply pipe head connected to an inlet of the second water supply channel, and wherein the first water supply pipe head and the second water supply pipe head are disposed in the mounting channel.

9. The spray pipe assembly according to claim 1, further comprising a nozzle panel disposed on a top of the flushing nozzle, and wherein the at least one spray hole is disposed on the nozzle panel.

10. The spray pipe assembly according to claim 1, wherein the pipe body is a curved bend pipe, and the at least one spray hole extends forwards and upwards at an angle when the pipe body is in an extension state.

11. The spray pipe assembly according to claim 1, further comprising a mounting groove disposed on a front side of the device main body, wherein the flushing spray head is disposed in the mounting groove, and wherein an end cap is removably connected to a front portion of the mounting groove.

12. A spray pipe device, comprising:

a spray pipe assembly, comprising:

a pipe body comprising:

a mounting channel configured to mount a water pipe;

a flushing device, removably mounted at a front end of the pipe body, the flushing device comprising:

a device main body comprising a mounting cavity;

a flushing nozzle configured to clean a human body, wherein at least a portion of the flushing nozzle is disposed in the mounting cavity, and the flushing nozzle comprises at least one spray hole facing upwards; and a flushing spray head configured to clean a toilet cavity and connected to the device main body, wherein the flushing spray head comprises a spray head facing downwards;

a mounting bracket, wherein the pipe body is slidably connected to the mounting bracket; and a driving mechanism connected to the pipe body and configured to drive the pipe body to extend out forwards and retract backwards, a spray hole water supply channel formed between the flushing nozzle and a wall of the mounting cavity and in fluid communication with the at least one spray hole;

a spray head water supply channel formed between the flushing nozzle and the wall of the mounting cavity and in fluid communication with the spray head; and a control water valve connected to at least two water supply hoses, wherein the spray hole water supply channel and the spray head water supply channel are separately arranged, wherein an inlet of the spray hole water supply channel and an inlet of the spray head water supply channel are disposed in the mounting channel, and wherein the at least two water supply hoses pass through the mounting channel and are respectively connected to the inlet of the spray hole water supply channel and the inlet of the spray head water supply channel, a pipe body rack disposed on a bottom of the pipe body, wherein the driving mechanism comprises:

a drive motor;

a worm connected to an output shaft of the drive motor; and a drive gear set, wherein an input end gear of the drive gear set is engaged with the worm, and wherein an output end gear of the drive gear set is engaged with the pipe body rack.

13. A method for cleaning a human body and a toilet cavity by using a spray pipe device, the method comprising:

extending, by a driving mechanism of the spray pipe device, a pipe body of the spray pipe device into the toilet cavity in response to a user command; and selectively spraying water upwards from at least one spray hole of a flushing nozzle to clean the human body or spraying water downwards from a spray head of a flushing spray head to clean the toilet cavity in response to the user command, wherein spraying water upwards from the at least one spray hole of the flushing nozzle to clean the human body comprising:

opening, by a control valve, a first water supply channel of a spray hole water supply channel to supply the water to a front spray hole of the at least one spray hole; and opening, by the control valve, a second water supply channel of the spray hole water supply channel to supply the water to a rear spray hole of the at least one spray hole, and wherein spraying the water downwards from the spray head of the flushing spray head to clean the toilet cavity comprising:

opening, by the control valve, a spray head water supply channel to supply the water to the spray head wherein the second water supply channel is disposed above the first water supply channel, and wherein the spray head water supply channel is disposed between the first water supply channel and the second water supply channel.

14. The method according to claim 13, wherein supplying the water to the front spray hole of the at least one spray hole comprises:

supplying the water from the first water supply channel to the front spray hole through a water cavity communication hole and a nozzle water cavity, and wherein supplying the water to the rear spray hole of the at least one spray hole comprises:

supplying the water from the second water supply channel to the rear spray hole through a water channel communication hole and a nozzle water channel.

* * * * *